United States Patent [19]

Iijima et al.

[11] Patent Number: 4,755,702
[45] Date of Patent: Jul. 5, 1988

[54] THREE-PHASE INDUCTION MOTOR

[75] Inventors: Hiroshi Iijima; Tetsuo Endo; Yukio Miyamoto; Kiyokazu Okamoto, all of Tokyo, Japan

[73] Assignee: NEC Corporation, Japan

[21] Appl. No.: 588

[22] Filed: Jan. 6, 1987

[30] Foreign Application Priority Data

Jan. 8, 1986 [JP] Japan ................................. 61-1884

[51] Int. Cl.$^4$ .......................................... H02K 17/00
[52] U.S. Cl. .................... 310/166; 310/184; 310/198
[58] Field of Search .................... 310/166, 198, 184

[56] References Cited

PUBLICATIONS

Liwschitz-Garik, *Winding Alternating-Current Machines*, 1950, Van Nostrand, pp. 264, 265, 321, 322, 373, 371.

*Primary Examiner*—Mark O. Budd
*Attorney, Agent, or Firm*—Ostrolenk, Faber, Gerb & Soffen

[57] ABSTRACT

A three-phase induction motor includes winding slots and a stator winding. The number of winding slots per pole per phase is a noninteger. The stator winding is a three-phase balanced winding. A pitch s of the winding satisfies $s=(r-t)/r$ or $s=r/(r+t)$ (where t is an odd number and r is the order of a harmonic wave to be suppressed).

4 Claims, 4 Drawing Sheets

THREE-PHASE INDUCTION MOTOR

BACKGROUND OF THE INVENTION

The present invention relates to a three-phase induction motor and, more particularly, to a three-phase induction motor having a relatively small capacity (e.g., an output of 1 kW or less) and aiming at torque smoothing.

Three-phase induction motors have been widely applied in general industrial machines such as various machine tools since constant speeds can be obtained when the motors are simply connected to three-phase power sources.

The torque T of a three-phase induction motor is given by the following equation:

$$T = M(-j\dot{I}_1)\dot{I}_2$$

where M is the mutual inductance between the primary and secondary windings, $-j\dot{I}_1$ is the primary current (stator current) vector, and $\dot{I}_2$ is the secondary current (rotor current) vector.

In order to smooth the torque of the three-phase induction motor, positional variations in the mutual inductance M and harmonic components of the primary and secondary current vectors $\dot{I}_1$ and $\dot{I}_2$ must be eliminated. The primary current vector $\dot{I}_1$ is determined by a power source waveform and cannot be improved in the induction motor. However, there is much room to improve the mutual inductance M and the harmonic components based on the second current vector $\dot{I}_2$.

The number N of slots formed in the stator of the three-phase induction motor is determined by:

$$N = \text{(number 1 of poles)} \times \text{(number m of phases)} \times \text{(number q of slots per pale per phase)}$$

In a conventional induction motor, since a stator winding can be easily and uniformly wound, the stator is designed such that the number q of slots is an integer. For this reason, positional variations in the mutual inductance M and the harmonic influence of the secondary current vector $\dot{I}_2$ cannot be eliminated.

FIGS. 1(a) to 1(e) explain the mutual inductance M in the prior art. FIG. 1(a) shows positions of stator slots when the number of poles, is 2, the number of phases are 3, and the number of slots per pole per phase is 2, i.e., the total number of slots is 12. FIG. 1(b) is a developed view of the disposition of slots in FIG. 1(a) FIG. 1(c) shows variations in magnetic flux in the air gaps corresponding in position to the slots and FIG. 1(d) shows an S-pole slot disposition corresponding to the N-pole slot disposition and magnetic flux variations of the S pole. In other words, FIG. 1(d) is obtained by shifting the portions included in the S pole in FIGS. 1(b) and 1(c) in a direction indicated by arrow A. FIG. 1(e) shows variations in the mutual inductance M caused by a combination of the N- and S-pole magnetic flux variations. As shown in FIG. 1(e), variations in the mutual inductance M are large cause variations in torque T, thus interfering with smooth rotation of the induction motor.

It is desirable to obtain a sinusoidal magnetic flux distribution in the gap between the stator and the rotor. However, in practice, the magnetic flux distribution is not sinusoidal but stepwise because a wire is wound around the core of the stator to fill the slots. Therefore, the stepwise waveform includes a plurality of harmonic components. The harmonic components cause undesirable phenomena such as generation of a torque ripple, noise, vibrations, and a temperature rise. The harmonic components have a larger number of steps when the number of slots per pole per phase in the stator is increased. The increase in the number of steps makes it possible to provide a substantially sinusoidal waveform. For this reason, the number of slots can be increased in a large motor, but it cannot be increased over a certain limitation. An rth order harmonic voltage Er induced in the secondary winding is expressed as follows:

$$Er \propto \phi \times Kd \times Kp \qquad (1)$$

where $\phi$ is the magnetic flux, Kd is the distribution coefficient, and Kp is the short node winding coefficient if a pitch s of the stator winding is defined as $s=(r-t)/r$ or the long node winding coefficient if the pitch s is defined as $s=r/r+t$ (where t is an odd number). The coefficients Kd and Kp for $t=1$ are given by:

$$Kd = \{\sin(r\pi/2m)\}/\{q\sin(r\pi/2mq)\} \qquad (2)$$

where r is the harmonic order, m is the number of phases, and q is the number of slots per pole and phase.

$$Kp = \{\sin r\pi/2 \cdot \sin(rW\pi/2\tau)\} \qquad (3)$$

where w is the coil pitch represented by the number of slots, and $\tau$ is the number of slots per pole.

Since the coefficients Kd and Kp are determined by the pitch S of the stator winding, i.e., the slot positions, predetermined harmonic components cannot be eliminated.

A conventional compact induction motor, therefore, tends to generate a torque ripple. If such a motor is used as a servo drive source in a machine tool or an industrial robot, various problems result. More specifically, in the case of a machine tool, a blade cannot be smoothly driven and the cut surface is roughened. In the case of a robot, its arm cannot be moved smoothly.

SUMMARY OF THE INVENTION

It is an object of the present invention to eliminate the conventional problems described above and to provide a compact three-phase induction motor producing less torque ripple.

The three-phase induction motor according to the present invention comprises a stator having a number of winding slots per pole and phase which is a noninteger, and a stator winding as a three-phase balanced winding having a pitch s given by:

$$s = (r-t)/r$$

or $$s = r/(r+t)$$

where r is the order of a harmonic to be eliminated, and t is an odd number.

DETAILED DESCRIPTION OF THE PREFERRED EMBODIMENTS

Preferred embodiments of the present invention will be described with reference to the accompanying drawings. Before the present invention is described in detail, its principle will be explained below.

If the number of slots per pole per phase is given as a noninteger q:

$$q = a + c/b = (ab + c)/b$$

a substitution of the above equation (2) yields the following equation:

$$Kd = \{\sin(r\pi/2m)\}/[(ab+c)\cdot\sin\{r\pi/2m(ab+c)\}] \tag{4}$$

The coefficient Kd for a=2, b=2, and c=1, that is, q=2.5 is equal to the coefficient Kd for q=5 in equation (2) since ab+c=5. This implies the following conclusion. If the q value is a noninteger, the same effect as in the case wherein the q value is increased can be obtained. In other words, the effect is the same as in the case wherein the number of slots is increased to reduce variations in the mutual inductance M. Therefore, the Er value represented by equation (1) can be reduced.

If r, w, and τ values according to the design according to the present invention are substituted in equation (3), then Kp=0. In other words, the induced voltage Er for a specific harmonic of the rth order can be controlled to be zero by changing the pitch of the windings. As a result, the rth order harmonic current is not supplied to the rotor.

Since the waveform of the magnetic flux generated in the air gap between the rotor and the stator is symmetrical, no harmonic components of even-numbered orders are, in general, produced. In addition, when an induction motor has three phases, waves of the orders given by an integer multiples of 3 are in phase with each other and do not appear across the terminals, and the corresponding harmonic currents are not supplied therebetween. Then, only the harmonic currents of the remaining 5th order, the 7th order, the 11th order, 13th order,... are supplied across the terminals. The most harmful harmonic component is selected, and the winding pitch is selected to eliminate such a component.

The value of the number q of slots per pole per phase is selected such that the number of slots formed in the stator satisfies the relationship with the pitch s of the winding and that a three-phase balanced winding can be obtained. Whether a three-phase balanced winding can be obtained is determined in the following manner. Assume that the number obtained by dividing the total number N of slots by a greatest common measure of the number N and the number P of pole pairs is given as N0, and that the number of phases is m. If N0/m=an integer, then a two-layer winding can be obtained. If N0/2m= an integer, then a one-layer or two-layer winding can be obtained. However, if N0/m and N0/2m are both nonintegers, a three-phase balanced winding cannot be obtained, and the corresponding number of slots cannot be employed.

Figure 2:
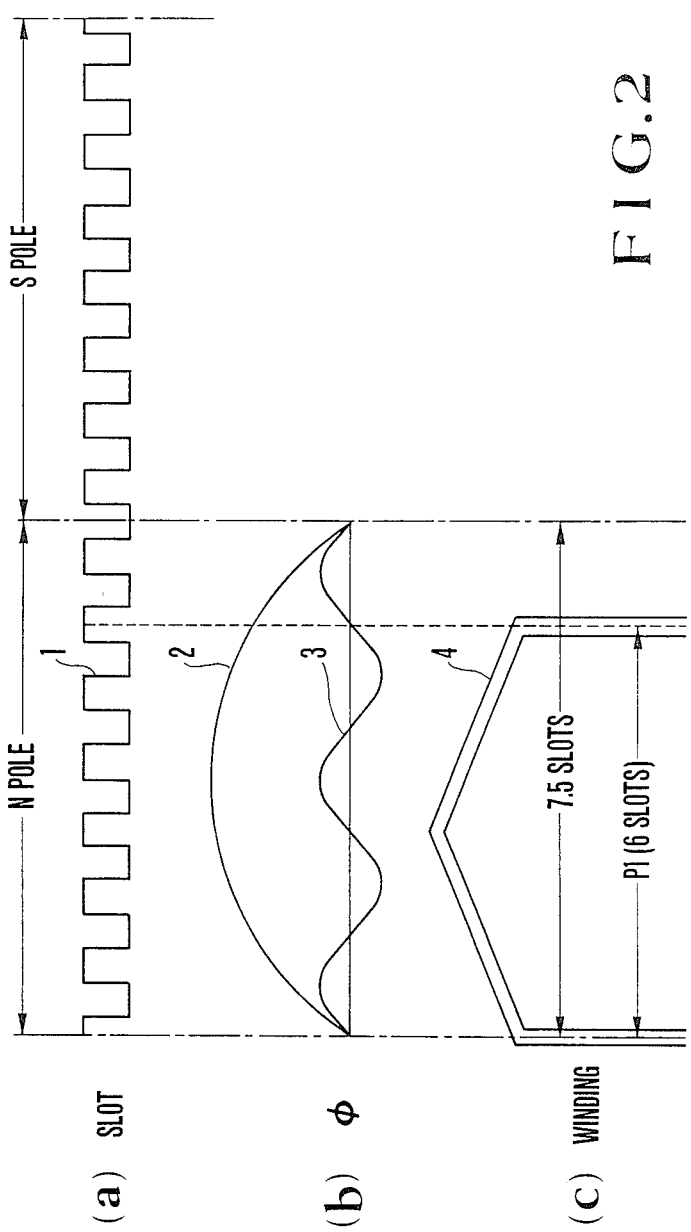
FIGS. 2(a) to 2(c) are views for explaining an embodiment of the present invention.

FIGS. 2(a) to 2(c) show an embodiment of the present invention, exemplifying the case wherein the number 1 of poles is 2, the number m of phases is 3, and the number q of slots per pole per phase 2.5. In other words, the case when the number N of slots is 15 (=2×3×2.5) is exemplified.

FIG. 2(a) is a developed view of stator slots 1. FIG. 2(b) shows a magnetic flux distribution represented by a fundamental wave 2 and a harmonic wave 3 of the fifth order which is to be eliminated, and FIG. 2(c) shows the relationship between the pitch P1 of a stator winding 4 and the positions of the slots 1.

Figure 1:
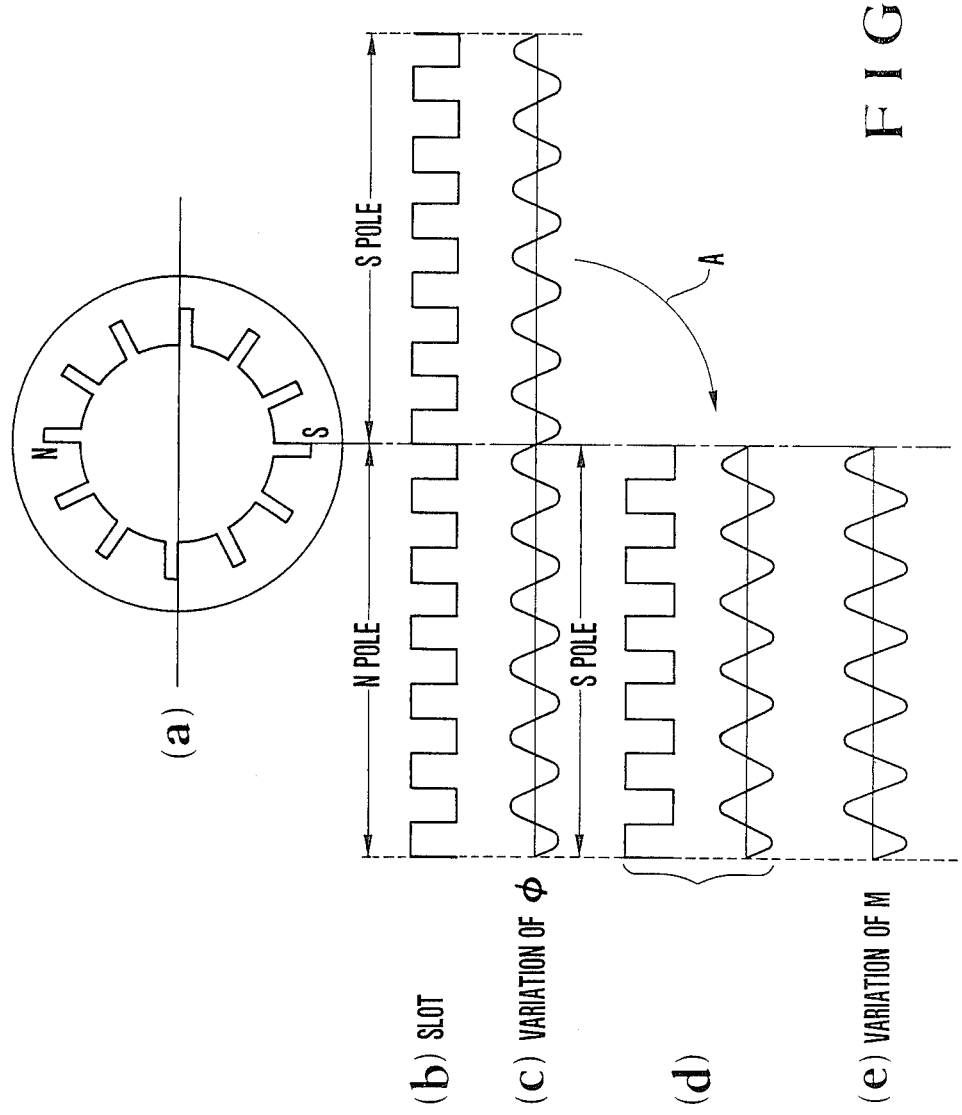
FIGS. 1(a) to 1(e) are views for explaining a conventional three-phase induction motor.

Since the harmonic wave of the fifth order is an object to be eliminated in this embodiment, the stator winding pitch s is given as (r-1)/r=4/5=0.8. In other words, the number τ of slots per pole is 15/2=7.5. A winding pitch w represented by the number of slots is given as 6 (slots)=7.5×0.8. The winding is located at the fourth node of the harmonic wave of the fifth order. As is apparent from the same case as in FIG. 1 wherein the S-pole distribution overlaps the N-pole distribution, the harmonic wave of the fifth order is cancelled to zero.

In this embodiment, since N=15 and P=1, then N0=15 and the number of phases, i.e., m=3. An integer is obtained as N0/m=15/3=5, and a three-phase balanced winding can be obtained.

Figure 3:
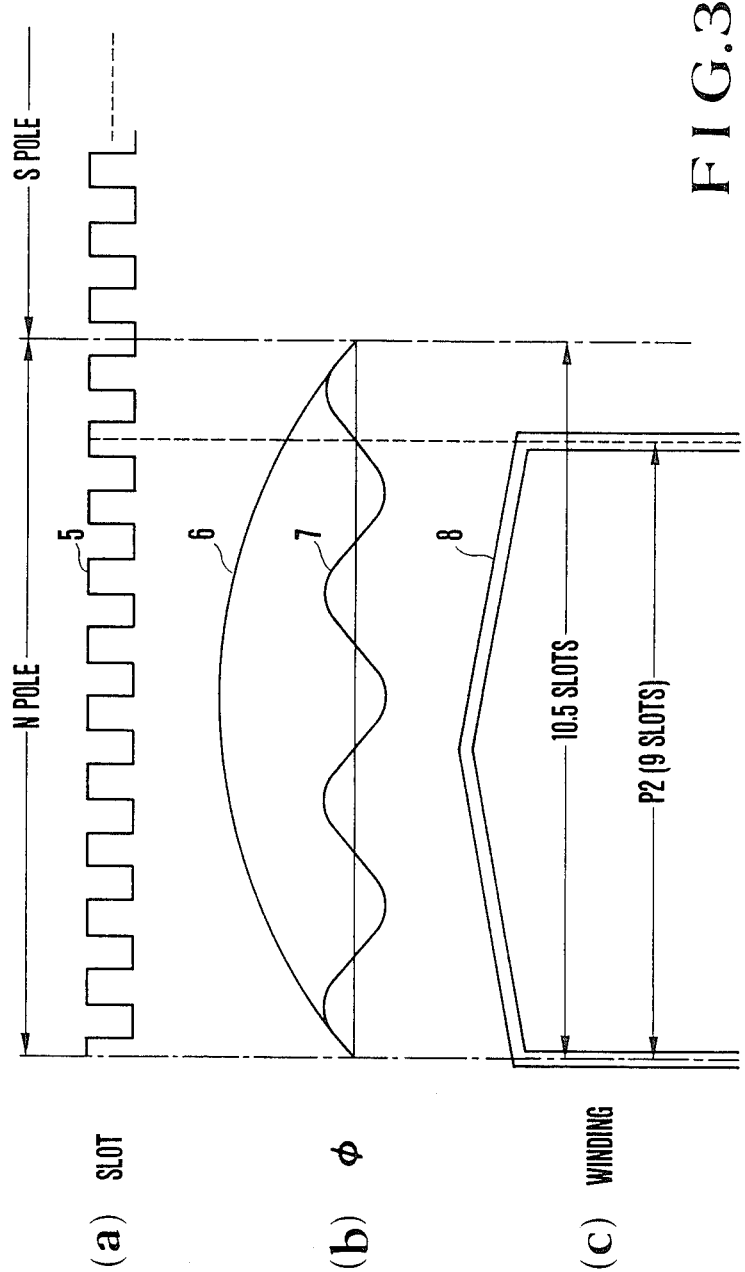
FIGS. 3(a) to 3(c) are views for explaining another embodiment of the present invention.
Figure 4:
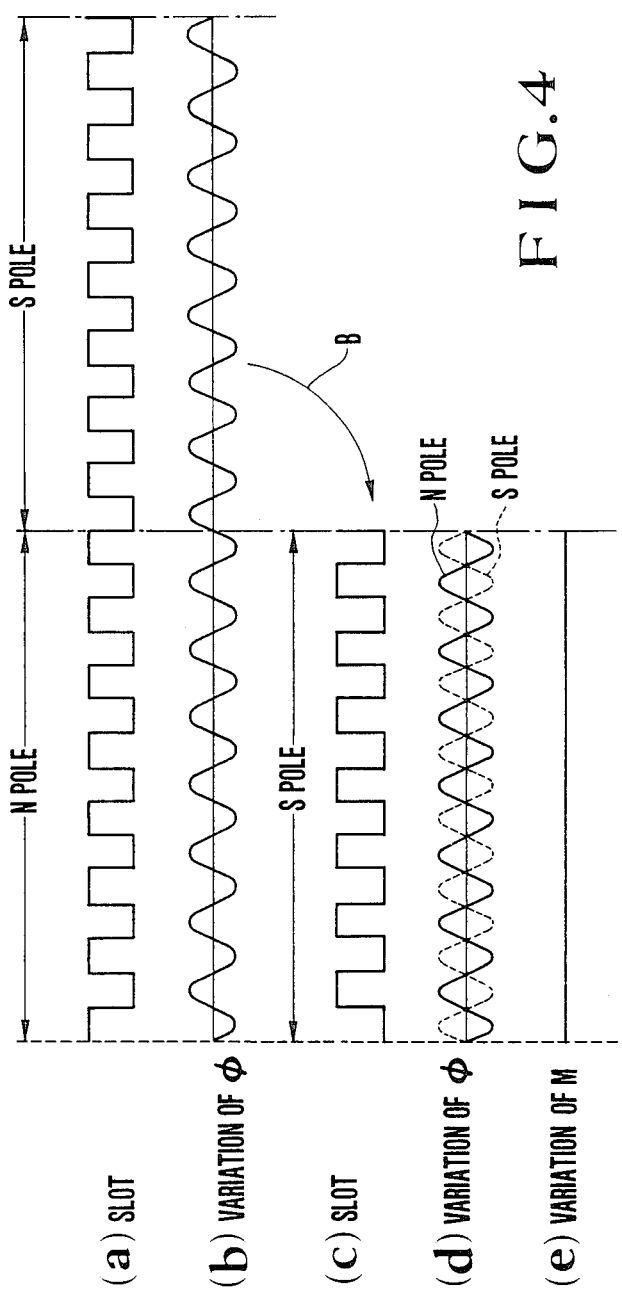
FIGS. 4(a) to 4(e) are views for explaining the effect of the present invention.

FIG. 3 shows another embodiment of the present invention, exemplifying the case wherein the number l of poles is 2, the number m of phases is 2, and the number q of slots per pole per phase is 3.5. Therefore, the case when the number of slots being N=2×3×3.5=21 is exemplified.

FIG. 3(a) is a developed view of stator slots 5, FIG. 3(b) shows a magnetic field distribution represented by a fundamental wave 6 and a harmonic wave 7 of the seventh order to be eliminated, and FIG. 3(c) shows the relationship between the pitch P2 of a stator winding 8 and the positions of the slots 5.

Since the harmonic wave of the seventh order, i.e., r=7 is to be eliminated in this embodiment, the stator winding pitch s is given as s=(r-1)/r=6/7. In other words, the number of slots per pole is 10.5 (=21/2). The winding is controlled to be located at the 9th slot (i.e., 9=10.5×6/7). With this arrangement, the winding is located at the sixth node of the harmonic wave of the seventh order, and the harmonic wave is not induced.

A further consideration will be made to determine according to the above-mentioned discrimination expression whether a three-phase balanced winding can be obtained when a winding is formed at each ninth slot for a total number N of slots of 21. In this case, the ratio N0/m=21/3=7, which is apparently an integer so that a two-layered winding can be obtained.

If the number l of poles is 4, this case corresponds to the one wherein the number of slots is doubled in the first and second embodiments. Therefore, three-phase balanced windings can be obtained when total numbers of slots are 30 and 42.

In the embodiment described above, variations in the mutual inductance M correspond to those in FIG. 1(e). The N-pole and S-pole components cancel each other to be zero, as shown in FIGS. 4(a) to 4(e).

According to the present invention as described above, a three-phase induction motor having less torque ripple components can be prepared by using a stator having a relatively small number of slots. Therefore, the three-phase induction motor according to the present invention serves as a compact drive source in a servo mechanism requiring smooth torque changes.

What is claimed is:

1. A three phase induction motor, comprising:

a rotor having a rotor winding thereon; and a stator having winding slots formed therein and a stator winding wound in said slots as a three-phased balanced winding; the number of said winding slots per pole per phase being a non-integer; the pitch of said stator winding satisfying the equation $s=(r-t)/r$ or $s=r/(r+t)$, where t is an odd number and r is the order of an undersirable harmonic wave, whose generation in said rotor winding is to be suppressed.

2. A motor according to claim 1, wherein $t=1$.

3. A motor according to claim 2, wherein said stator includes 15 slots, 2 poles, three phases and 2.5 slots per pole per phase, and the order of said harmonic wave to be suppressed is 5.

4. A motor according to claim 2, wherein said stator includes 21 slots, two poles, three phases and 3.5 slots per pole per phase, and the order of said harmonic wave to be suppressed is 7.

* * * * *